United States Patent
Birman et al.

(10) Patent No.: US 9,200,930 B2
(45) Date of Patent: Dec. 1, 2015

(54) DUAL COLOR POINTER ARM FOR AN INSTRUMENT GAUGE

(71) Applicant: Continental Automotive Systems, Inc., Auburn Hills, MI (US)

(72) Inventors: Vyacheslav Borisovich Birman, Auburn Hills, MI (US); Tao-Chuan Wang, Novi, MI (US); Curt Ollila, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 410 days.

(21) Appl. No.: 13/721,090

(22) Filed: Dec. 20, 2012

(65) Prior Publication Data
US 2014/0174335 A1 Jun. 26, 2014

(51) Int. Cl.
*G01D 13/26* (2006.01)
*G01D 11/28* (2006.01)

(52) U.S. Cl.
CPC .............. *G01D 13/265* (2013.01); *G01D 11/28* (2013.01); *G01D 13/26* (2013.01)

(58) Field of Classification Search
CPC ...... G01D 11/28; G01D 13/265; G01D 13/26
USPC ............... 116/281, 286–288, 304, DIG. 6, 116/DIG. 36, DIG. 41; 362/27, 30, 309–310, 362/555, 558, 560
See application file for complete search history.

(56) References Cited

U.S. PATENT DOCUMENTS

| | | | | |
|---|---|---|---|---|
| 4,860,170 | A * | 8/1989 | Sakakibara et al. | 362/26 |
| 5,320,063 | A * | 6/1994 | Ogura et al. | 116/288 |
| 6,004,001 | A * | 12/1999 | Noll | 362/30 |
| 7,556,390 | B2 * | 7/2009 | Takato | 362/27 |
| 7,665,413 | B2 * | 2/2010 | Birman et al. | 116/288 |
| 7,724,129 | B2 * | 5/2010 | Altomonte | 340/461 |
| 7,814,859 | B2 * | 10/2010 | Fournier | 116/328 |
| 7,930,990 | B2 * | 4/2011 | Fournier | 116/332 |
| 8,638,206 | B2 * | 1/2014 | Boutin | 340/438 |
| 8,678,602 | B2 * | 3/2014 | Deom et al. | 362/23.07 |
| 2007/0035960 | A1 * | 2/2007 | Birman et al. | 362/489 |
| 2013/0092078 | A1 * | 4/2013 | Denise | 116/288 |
| 2014/0168938 | A1 * | 6/2014 | Bravo et al. | 362/23.07 |

* cited by examiner

*Primary Examiner* — R.A. Smith
*Assistant Examiner* — Tania Courson

(57) ABSTRACT

A dual colored pointer arm for an instrument gauge constructed of a clear material and having a coated bi-color top surface.

17 Claims, 2 Drawing Sheets

US 9,200,930 B2

DUAL COLOR POINTER ARM FOR AN INSTRUMENT GAUGE

TECHNICAL FIELD

The present disclosure is related generally to instrument clusters for vehicles, and more specifically to a pointer for use in an instrument cluster gauge.

BACKGROUND OF THE INVENTION

Operation of motor vehicles requires the operator to monitor multiple conditions of the engine and the vehicle. For example, in a manual gear shift vehicle, the operator may benefit from having access to the revolutions per minute (RPMs) of the engine and the speed of the vehicle at all times. Furthermore, it can also be desirable to provide alternate information to a vehicle operator, such as engine temperature in addition to the mandatory information described above.

To present this information, vehicles typically include an instrument cluster located in a position that is easily viewable from the operator's position. The instrument cluster includes multiple gauges, with each gauge indicating information related to one or more of the above described conditions. Each gauge has a pointer affixed to a center of the gauge, and the pointer rotates to indicate corresponding information such as vehicle speed. One example type of pointer utilized for this purpose is a pointer constructed of a clear material with no coloration on a surface facing the user.

SUMMARY OF THE INVENTION

Disclosed is an instrument cluster for a motor vehicle including an instrument cluster gauge having a appliqué, a pointer mounted through a center portion of the appliqué, and a gauge indicator on an outer periphery of the appliqué. Wherein the pointer includes a pointer arm constructed of a clear material, the pointer arm includes a top surface facing away from the appliqué, and the top surface is coated with at least a first translucent color in a first region and a second translucent color in a second region, thereby achieving a bi-color pointer arm effect.

Also disclosed is an instrument cluster gauge including a appliqué, a pointer mounted through a center portion of the appliqué, and a gauge indicator on an outer periphery of the appliqué. The pointer includes a pointer arm constructed of a clear material. The pointer arm includes a top surface facing away from the appliqué, and the top surface is coated with at least a first translucent color in a first region and a second translucent color in a second region, thereby achieving a bi-color pointer arm effect.

These and other features of the present invention can be best understood from the following specification and drawings, the following of which is a brief description.

DETAILED DESCRIPTION OF AN EMBODIMENT

Figure 1:
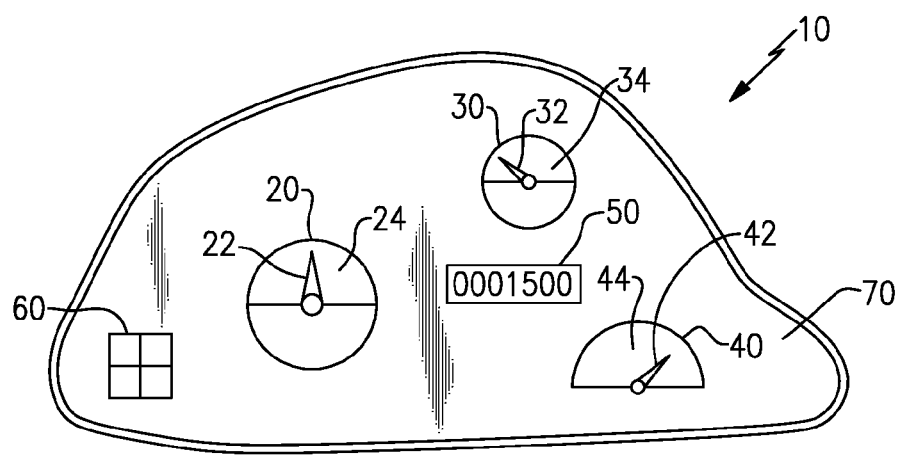
FIG. 1 illustrates an example instrument cluster.

FIG. 1 illustrates an instrument cluster 10. The instrument cluster 10 includes a speedometer 20, a tachometer 30, and an engine temperature gauge 40. Also included in the instrument cluster 10 are multiple engine condition indicators 60 and an odometer 50. In alternate examples the gauges 20, 30, 40 are located in different configurations and additional gauges can be included or omitted as needed. A lens 70 covers the instrument cluster 10. The lens 70 can be smoked, clear, or otherwise tinted to allow only a portion of light through the lens 70. By allowing only a portion of light through the lens 70, and ensuring that the instrument lights are sufficiently bright within the instrument cluster 10, ambient light such as daylight is prevented from washing out the gauges 20, 30, 40 and making them difficult or impossible to read by an operator during high ambient light conditions.

Each of the gauges 20, 30, 40 within the instrument cluster 10 includes a pointer 22, 32, 42. The pointer 22, 32, 42 is connected to the center of a face plate 24, 34, 44. The pointer 22, 32, 42 rotates and points at a gauge indicator on the face plate 24, 34, 44 of the gauge to convey corresponding information. Each of the pointers 22, 32, 42 includes a dual colored top surface facing the viewer for aesthetic effect.

Figure 2:
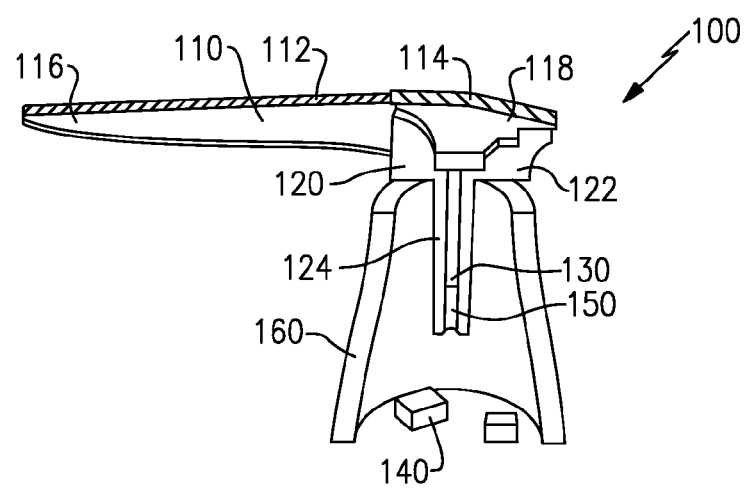
FIG. 2 illustrates a cross sectional view of a pointer for use in a gauge in the example instrument cluster of FIG. 1.

FIG. 2 illustrates an example dual colored pointer 100 that can be used on one or more of the gauges 20, 30, 40 of FIG. 1. The pointer 100 includes a pointer arm 110 that is connected to a light housing 160 via a light guide 120. The pointer arm 110 extends away from the light guide 120 approximately parallel to the appliqué of the gauge in which the pointer 100 is installed. The light guide 120 fits in a light guide opening 122 in the pointer arm 110 and is connected to the pointer arm 110 via at least one fastener feature (see FIG. 3.) The portion of the pointer arm 110 that is farthest away from the light guide 120 is referred to as the tip 116 and the portion of the pointer arm 110 that is contacting the light guide 120 is referred to as the tail 118.

The light guide 120 includes a shaft 124 that extends toward the appliqué of the gauge. The light guide 120 is constructed of a clear material and allows light from a light source within the light housing 160 to be transmitted into the pointer arm 110. A shaft receiving passageway 130 of the light guide 120 includes a shaft receiving portion 150. The shaft receiving portion 150 accepts a shaft that controls rotation of the pointer 100. The shaft turns, causing the light guide 120 to rotate, which in turn causes the pointer arm 110 to rotate. In some examples, the shaft is controlled via a stepper motor connected to a sensor or an engine controller.

Maintained within the housing 160 is a light source, such as at least one LED 140. The LED 140 functions as a light source and emits light up through the light guide 120 into the pointer arm 110. The light passes through the body of the light guide 120. The light exits the mounting body of the light guide 120 and enters the tail 118 of the pointer arm 110. The pointer arm 110 is constructed of a clear material causing the light to propagate from the tail 118 down the pointer arm 110 to the tip 116 of the pointer arm 110. A top surface (the surface facing away from the appliqué) of the pointer arm 110 is coated with translucent paint in two colored sections 112, 114. A first color translucent paint covers a main body colored section 112 of the top surface of the pointer arm 110, and a second color of translucent paint covers a tail colored section 114 of the top surface of the pointer arm 110.

As light is transmitted through the pointer arm 110, a portion of the light bleeds through the color sections 112, 114 of the top surface resulting in a colored glow, or illumination.

In some examples, the glow or illumination is sufficiently bright so that the pointer arm 110 can be seen through a smoked or tinted instrument cluster lens. The brightness of the light is controlled via the amount of light emitted from the LED 140, the translucency of the pointer arm 110 material, the translucency of the colored paint, or any combination of the above.

By painting the main body colored section 112 with a first translucent color and the tail colored section 114 with a second translucent color, the pointer arm 110 achieves a desirable bi-color aesthetic affect. In some example pointer arms, the entire top surface of the pointer arm 110 is coated with the first translucent color, and the tail colored section 114 is then coated over with the second translucent color to achieve the bicolor affect. In alternate arrangements, only the main body colored section 112 is coated with the first translucent color and the tail colored section 114 is coated with only the second translucent color.

Figure 3:
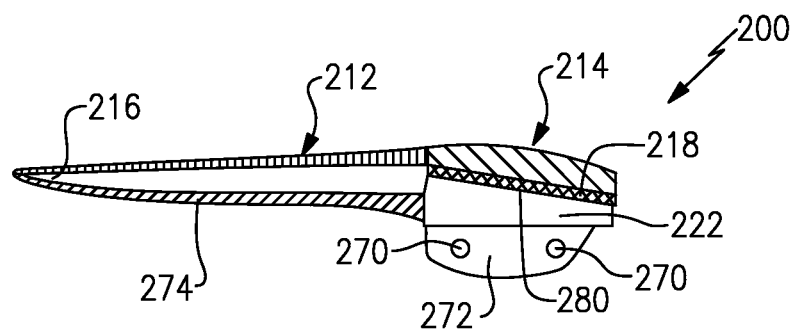
FIG. 3 illustrates a side view of an alternate pointer that can be used of a gauge of the example instrument cluster of FIG. 1.

FIG. 3 illustrates an alternate example pointer arm 200. The pointer arm 200 is connected to a light guide and stepper motor (not shown) in the same manner as described above with regards to FIG. 2. The alternate example pointer arm 200 includes a tip 216 and a tail 218 and a top surface divided into a main body colored section 212 and a tail colored section 214. As with the example of FIG. 2, the main body colored section 212 is coated in a first translucent color and the tail colored section 214 is coated in a second translucent color to achieve a bicolor aesthetic affect. The alternate example pointer arm 200 includes fastener features 270 located on a connection section 272. The connection section 272 allows the pointer arm 200 to be securely connected to a light guide. When attached to a gauge, the light guide is positioned within a light guide region 222 of the pointer arm 200 and the fastener features 270 connect to pegs on a side of the light guide, thereby holding the pointer arm 200 in position. In alternate examples, alternate fastener arrangements can be utilized to the same effect.

The pointer arm 200 illustrated in FIG. 3 also includes a coated bottom surface 274 of a main body section of the pointer arm 200 and a coated bottom surface 280 of a tail section of the pointer arm 200. The coated bottom surfaces 274, 280 are coated with an opaque paint that does not allow light to pass through the bottom surfaces 274, 280. Instead, the opaque paint causes the coated surface 274, 280 to reflect light falling on the surface 274, 280. Painting the bottom surfaces 274, 280 causes the light passing through the main body colored section 212 and the tail color area 214 to have a more saturated color than the light reflected by the bottom surface, thereby causing the colored sections 212, 214 to appear more vibrant.

The coated bottom surface 280 underneath the tail section 214 of the pointer arm 200 is positioned between the light guide opening 222 and the tail section 214. By positioning the coated bottom surface 280 between these two elements, the contrast between the tail section color and the pointer arm color is enhanced as the light escaping through the translucent paint on the tail colored section 214 is transmitted through the pointer arm 200 and reflected back from the tip of the pointer arm. As the light travels farther, more of the light dissipates before reaching the tail colored section 214, causing the tail colored section 214 to appear dimmer. This contrasting affect can also be achieved, or magnified by, using the painting technique of painting the tail colored section with a first coat of a first translucent color and a second coat of a second translucent color, as described above.

The coated bottom surface 218 can also have an angle, relative to the light guide and light guide shaft. The angle reflects and directs light from the light guide down the pointer arm 110, thereby increasing the amount of light passed into the pointer arm 200 and increasing the brightness of the pointer arm 200. In some examples, the opaque paint on the bottom surfaces 274, 280 can be a reflective paint or a foil. The reflective paint further increase the amount of light that is transmitted through the pointer arm and out through the translucent coated surfaces 212, 214.

While the illustrations of FIGS. 2 and 3 show the top color surfaces 212, 214 as butting against each other, some alternate examples can include an uncoated gap between the two colored surfaces 212, 214. The uncoated gap shows the base color of the pointer arm 200 or the color of the bottom paint on the bottom surfaces 274, 280. This arrangement results in a tri-color affect, and provides a line dividing the main body colored section 212 and the tail colored section 214.

Figure 4:
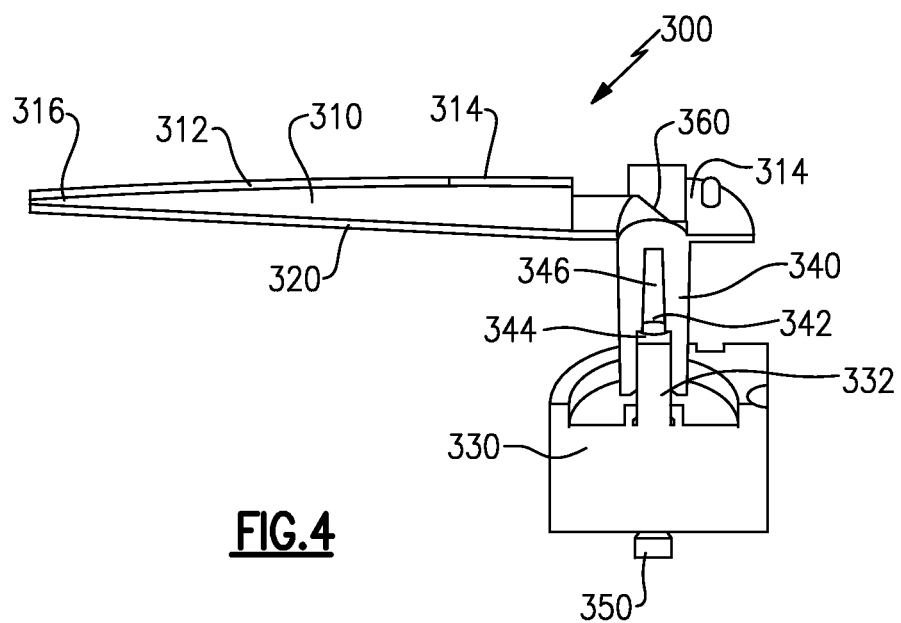
FIG. 4 illustrates a side view of a second alternate example pointer for use in a gauge in the example instrument cluster of FIG. 1.

FIG. 4 illustrates another alternate pointer arm 310 for a gauge pointer 300. The example pointer arm 310 of FIG. 3 is connected to a clear shaft stepper motor 330 directly and does not include a light housing such as the light housing 160 illustrated in FIG. 2. As with the previously described examples, the pointer arm 310 includes a top surface with a main body region 312 and a tail region 314. The main body region 312 and the tail region 314 are coated different translucent colors, thereby achieving a bicolor affect as the light shines through the pointer arm 310. In some examples, a bottom surface 320 facing a gauge appliqué is coated with an opaque paint that reflects light passing through the pointer arm 310 instead of allowing light to pass out of the pointer arm 310.

The pointer arm 310 of FIG. 4 also includes a shaft portion 340 for connecting to a shaft 332 of the clear shaft stepper motor 330. The shaft portion 340 includes an opening 342 that receives the shaft 332. The opening 342 is sized to tight fit the shaft 332, such that no additional fastener arrangement is required. The opening 342 can include a wider shaft region 344 and a thinner hole region 346 to better facilitate the connection between the shaft 330 and the shaft opening 340 and light transmission through the same. The shaft 332 of the clear shaft stepper motor 330 is constructed of either a clear material that allows light to transmit through the shaft 332 or a hollow component such as a tube. An LED 350, or other light source, is located on an end of the shaft 332 opposite the pointer 300 and transmits light through the shaft 332 of the stepper motor 330 and into the pointer arm 310.

The example light guide of FIG. 4 includes an angled surface 360. The angled surface 360 is positioned directly above the clear shaft 332 of the clear shaft stepper motor 330 and reflects light from the LED 350 down the pointer arm 310 portion of the pointer 300. The angle of the angled surface 360 can be determined by one of skill in the art in order to optimize the amount of light reflected down the pointer arm 310 to the tip 316. In some examples, the angle is approximately forty-five degrees relative to the shaft 332 of the clear shaft stepper motor 330.

Each of the above illustrated pointer arms 110, 200, 300 is shown having an exaggerated thickness of the coated surfaces for illustrative effect. It is understood that the thickness of the paint applied to the surfaces can be determined by one of ordinary skill in the art depending on the strength of the light source, the expected amount of environmental light, and a desired aesthetic affect. It is further understood that the clear material from which the pointer arm 110, 200, 300 is constructed can be a colorless or colored material, with a clear colored material altering the color of light emitted from the pointer arm 110, 200, 300.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An instrument cluster for a motor vehicle comprising:
   at least one gauge having a faceplate, a pointer mounted through a center portion of the appliqué, a light guide connected to the pointer, and a gauge indicator on an outer periphery of the appliqué; and
   wherein the pointer comprises a pointer arm having a pointer tip and a pointer tail constructed of a clear material, the pointer tail contacting the light guide, the pointer tail and the pointer tip each including top surfaces facing away from the appliqué, and wherein the top surface of the pointer tip is coated with at least a first translucent color and the to surface of the pointer tail is coated with at least a second translucent color, thereby achieving a bi-color pointer arm effect.

2. The instrument cluster of claim 1, wherein the pointer arm is connected to the at least one gauge via the light guide and a light housing, and wherein a light source is located within the light housing.

3. The instrument cluster of claim 2, wherein the light guide is constructed of a clear material and the light housing is constructed of an opaque material.

4. The instrument cluster of claim 2, wherein the pointer arm comprises an angled reflective surface positioned directly above the light guide, such that light passing through the light guide is transmitted down the pointer arm of the pointer.

5. The instrument cluster of claim 1, wherein the pointer is connected to the at least one gauge via a shaft of a clear shaft stepper motor.

6. The instrument cluster of claim 5, wherein the pointer arm comprises an angled reflective surface positioned directly above the clear shaft, such that light passing through the clear shaft is transmitted down the pointer arm of the pointer.

7. The instrument cluster of claim 1, wherein the pointer is connected to the at least one gauge via a shaft of a hollow shaft stepper motor.

8. The instrument cluster of claim 1, wherein the first translucent color is coated on both the pointer tip and the pointer tail, and the second translucent color is coated over the first translucent color on the pointer tail.

9. The instrument cluster of claim 1, wherein the pointer arm further comprises a bottom surface facing the appliqué and wherein the bottom surface is coated with an opaque paint.

10. An instrument cluster gauge comprising:
    a appliqué;
    a pointer mounted through a center portion of the appliqué;
    a gauge indicator on an outer periphery of the appliqué;
    a light guide connected to the pointer; and
    wherein the pointer comprises a pointer arm having a pointer tip and a pointer tail constructed of a clear material, the pointer tail and the pointer tip each including top surfaces facing away from the appliqué, and wherein the top surface of the pointer tip is coated with at least a first translucent color and the to surface of the pointer tail is coated with at least a second translucent color, thereby achieving a bi-color pointer arm effect.

11. The instrument cluster gauge of claim 10, wherein the pointer arm is connected to the gauge via the light guide and a light housing, and wherein a light source is located within the light housing.

12. The instrument cluster gauge of claim 11, wherein the light guide is constructed of a clear material and the light housing is constructed of an opaque material.

13. The instrument cluster gauge of claim 12, wherein the pointer arm comprises an angled reflective surface positioned directly above the light guide, such that light passing through the light guide is transmitted down the pointer arm of the pointer.

14. The instrument cluster gauge of claim 10, wherein the pointer is connected to the gauge via a shaft of a clear shaft stepper motor.

15. The instrument cluster gauge of claim 14, wherein the shaft is a clear shaft, and wherein the pointer arm comprises an angled reflective surface positioned directly above the clear shaft, such that light passing through the clear shaft is transmitted down the pointer arm of the pointer.

16. The instrument cluster gauge of claim 10, wherein the first translucent color is coated on both the pointer tip and the pointer tail, and the second translucent color is coated over the first translucent color on the pointer tail.

17. The instrument cluster gauge of claim 10, wherein the pointer arm further comprises a bottom surface facing the appliqué and wherein the bottom surface is coated with an opaque paint.

* * * * *

UNITED STATES PATENT AND TRADEMARK OFFICE
CERTIFICATE OF CORRECTION

PATENT NO.        : 9,200,930 B2
APPLICATION NO.   : 13/721090
DATED             : December 1, 2015
INVENTOR(S)       : Vyacheslav Borisovich Birman, Tao-Chuan Wang and Curt Ollila Page 1 of 1

It is certified that error appears in the above-identified patent and that said Letters Patent is hereby corrected as shown below:

In the claims

In column 5, line 23, that portion of claim 1 reading "the to surface of the pointer tail" should be changed to "the top surface of the pointer tail".

Signed and Sealed this
Nineteenth Day of April, 2016

Michelle K. Lee
*Director of the United States Patent and Trademark Office*